G. W. PICKARD.
METER FOR ELECTROMAGNETIC WAVE COMMUNICATION.
APPLICATION FILED JULY 1, 1907.
993,316.
Patented May 23, 1911.
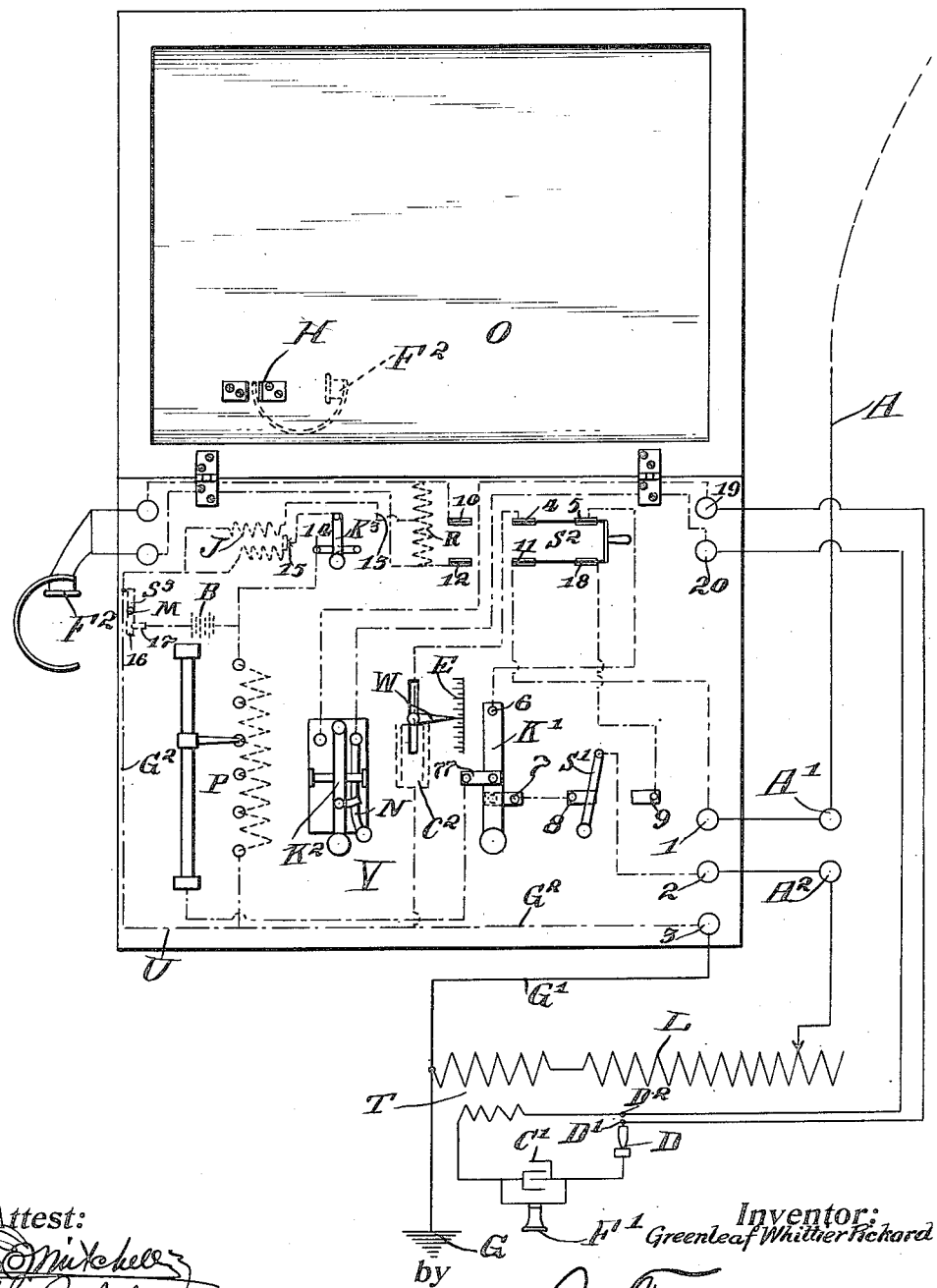
Attest:
Inventor:
Greenleaf Whittier Pickard
by
Philip Farnsworth Atty

UNITED STATES PATENT OFFICE.

GREENLEAF WHITTIER PICKARD, OF AMESBURY, MASSACHUSETTS.

METER FOR ELECTROMAGNETIC-WAVE COMMUNICATION.

993,316. Specification of Letters Patent. Patented May 23, 1911.

Application filed July 1, 1907. Serial No. 381,606.

*To all whom it may concern:*

Be it known that I, GREENLEAF WHITTIER PICKARD, a citizen of the United States of America, and a resident of the town of Amesbury, State of Massachusetts, have invented certain new and useful Meters for Electromagnetic-Wave Communication, the principles of which are set forth in the following specification and accompanying drawing, which disclose the form of the invention which I now consider to be the best of the various forms in which its principles may be embodied.

This invention relates to meters adapted for use in the art of communication by electro-magnetic waves and high frequency oscillations, one object among others being to reproduce at a receiving station the effective conditions caused thereat by a distant transmitting station (that is, any transmitting station, the energy received from which is to be measured) such that the conditions thus duplicated can be controlled and measured at the receiving station, for the purpose of making useful observations and measurements.

Instances of some of the various uses of the invention are the measurement of the received energy, of the capacity of the antenna or receiving conductor, and of the absolute sensitiveness of oscillation detectors.

The invention is disclosed in an article written by me entitled "The Measurement of Received Energy at Wireless Stations", and published in the *Electrical Review*, New York, December 15, 1906.

The invention is embodied in the apparatus disclosed hereinafter, and in the accompanying drawing, which shows the invention in a compact practical mechanical form adapted for commercial use.

In the drawing, the various parts of the apparatus are shown in and on a suitable box U provided with a hard rubber or other suitable insulating top V, and a hollow cover O which is to be closed over the top V when the contained apparatus is not in use. Some of the apparatus, and the circuit connections, are inside the box below the top V, as indicated in dotted and broken lines respectively. Other parts of the apparatus, on top or outside of the box, are shown in full lines, as are also shown the receiving circuits of the telegraph installation.

Of these latter, A indicates any particular main receiving conductor which may be in use; L indicates a variable tuning inductance, which may be in use at a particular installation; T represents any form of oscillation transformer, which may be replaced by any of the well known forms of coupling the detector circuit; and T, $C^1$, $F^1$, D is the detector circuit, in which $C^1$ is the usual condenser, $F^1$ an ordinary head telephone, and (for the purpose of measuring received energy) D is any self-restoring detector which responds to the square root of mean square value of oscillating or high frequency currents, such as the silicon detector of my United States Patent 836,531, as indicated in the drawing. The sensitiveness of any detector, however, can be measured by substituting it in place of the above described class of detectors; the requirement of the particular type mentioned being only for the purpose of measuring the received energy.

In the use of this invention as described herein, the antenna is broken at $A^1$, $A^2$, and these terminals are connected to the binding posts 1 and 2 of the measuring set or meter, which posts are mounted on the insulating top V. The switches $S^1$ and $S^2$ provide means for closing the circuit through $A^1$ and $A^2$ when it is desired to observe by means of the suitable detector D, (responding to the square root of the mean square value of the currents), the energy of the signals from a distant transmitting station, by noting the intensity of the sound in the telephone receiver $F^1$. These switches $S^1$ and $S^2$ also provide means for permitting the normal commercial operation of the installation through the measuring set as a permanent part of the installation, when no measurements are being made as by means of this invention. The invention may be applied to any system of receiving conductors by means of the provision of suitable contacts by one skilled in the art.

A ground lead $G^1$ is taken from the ground G to the binding post 3 of the measuring set, from which a lead $G^2$ within the box U is taken to one terminal of the condenser $C^2$, (which has small capacity), the other terminal of which condenser is connected to the contact 4 of the switch $S^2$, thus providing a comparative discharge circuit which leads back through the inductance L and transformer T to the ground connection $G^1$. This circuit extends from the switch contact 4 through the contact 5 of the same switch $S^2$, through the lead therefrom to the fixed end 6 of the flat spring key $K^1$, through said key to the under contact 7 of the same key $K^1$, the contact 8 of the switch $S^1$, the arm itself of switch $S^1$, and the binding post 2 and terminal $A^2$.

The operation now is, in measuring received energy, to observe the intensity of sound in the telephone $F^1$, due to single spark discharges or suitable Morse dots produced at the distant sending station; and then, after having made such observation, to produce such a discharge of condenser $C^2$ as will duplicate said effect as to intensity of sound in the telephone $F^1$. This balance of effect can be readily and very accurately observed, as it involves no comparison of different intensities of sound. The condenser $C^2$, of small capacity, may at this point in the description, be assumed to have the same capacity as that of antenna A. The inductance of the antenna, in commercial work, is always small in comparison with that of L and T, so that the periodicity of discharge of the condenser, through L and T (both of which are included alternately in the circuit of the installation and in that of the meter), will obviously be that of the distant sending station. The charge of the condenser may be varied by varying its source of potential until its discharge will produce in telephone $F^1$ precisely the same intensity of sound as that caused by the signal from the distant station.

To first observe the results of the action of the distant station, the testing operator will move the switch $S^1$ to the right from the position shown, to engage with contact 9, (the switch $S^2$ being closed in the position shown), thus permitting the space telegraph or telephone receiving circuits to operate in the ordinary manner, with a simple connection between $A^1$ and $A^2$, or the break in any receiving conductor which may be employed. After having observed the intensity of sound of the received signals in the ordinary way, the operator will quickly throw the switch $S^1$ to the left to engage contact 8 and put the comparing or condenser-discharge circuit (already described) in condition to be quickly closed by pressing the spring-key $K^1$ (normally in contact with 77 to close the condenser-charging circuit) down on the contact 7, thereby causing the discharge of condenser $C^2$ to produce conditions in the detector D and telephone $F^1$, similar to those produced by the signals from the distant station.

By successively and repeatedly observing both sets of sounds, and meanwhile varying the potential to which condenser $C^2$ is charged, the effect of the discharge of this condenser on the telephone $F^1$ may be made to be precisely the same as that of the signals from the distant station. Substantially all the energy of the abrupt condenser discharge will be absorbed in the detector circuit, where it is desired to be used, because the potential of the condenser charge is extremely small, and the time of the closure of key $K^1$ after the formation of the extremely short spark in air is extremely short, being much less than a micro-second, so that the dissipation losses in the spark discharge of condenser $C^2$ affect only a small portion of the first half period of the oscillation, and are consequently very small.

When the testing operator has obtained the same intensity of sound in telephone $F^1$ by the condenser, as is produced by the distant station, he reads the value of the potential on the scale of the potentiometer P, which is supplied with electromotive force by the battery B inside the box. Knowing this potential, and knowing the capacity of condenser $C^2$ as indicated by its scale E, the energy of the condenser discharge and therefore the energy received from the distant station may readily be calculated by the formula that the stored energy of a charged condenser is equal to one-half the product of the condenser-capacity and the square of the potential, or $$W \text{ joules} = \frac{C \text{ farads } V^2 \text{ volts}}{2} = .5CV^2.$$

The most useful unit of energy for such measurements is the erg, and employing this, the above equation then becomes $$W \text{ ergs} = 5(C \text{ microfarads } V^2 \text{ volts}) = 5CV^2.$$

As a preliminary to the above observations, and in order to insure absolute accuracy, the condenser $C^2$ may be adjusted so that its scale E indicates the same capacity as that of the antenna or receiving conductor. When the capacity of the receiving conductor is known, the adjustment will be made directly and at once. If it is not known, the adjustment may be made by first throwning the switch $S^2$ to the left to connect contact 4 with contact 10, and contact 11 with contact 12, thereby connecting conductor A and the ungrounded terminal of condenser $C^2$, to the terminals of the resistance R. This resistance R forms two equal arms of a Wheatstone bridge, because it is connected at its middle point by the lead 13 to one terminal of the secondary of the induction coil J, the other terminal of the secondary of this coil being grounded through the common ground $G^2$. The telephone $F^2$ is connected to the terminals of the resistance R, as shown. Now, by closing key $K^3$ on contact 14, circuit is completed through the battery B and primary of the induction coil J, thereby starting the interrupter 15 of the coil and inducing a low frequency alternating electromotive force in the secondary of the coil J. If the capacity of the condenser $C^2$ be not already that of antenna A, the Wheatstone bridge will not be in balance, because a greater or less amount of current will flow from the contact 10 through the condenser $C^2$ to ground, than will flow from contact 12 to the antenna-capacity A to ground. This unbalanced current will cause a difference of potential at the contacts 10 and 12 and the telephone $F^2$ connected thereto, due to the action of interrupter 15, thus causing a continuous sound in the telephone $F^2$. By varying the capacity of condenser $C^2$ by moving its scale-pointer W, the bridge may be balanced so that the telephone $F^2$ will not be operated. When this condition is attained the capacity of condenser $C^2$ will obviously be the same as that of antenna A. Any other of the various suitable means may be employed to adjust the condenser to the same capacity as that of the receiving conductor. The head telephone $F^2$, constituting a part of the set, may, when not in use, be conveniently held by spring-clips H in the hollow box-cover O. In all its uses, the battery B will be automatically connected in its circuits by the raising of the cover O, which releases the plunger M to permit the spring contact 16 to engage with the contact 17, the contact 16 being beneath the contact 17. The closing of the box open-circuits the battery.

The above described operation of measuring the energy received from a distant sending station, is dependent upon a suitable character of Morse dot, namely that consisting of a single discharge of the spark at the sending station. This result may be obtained by the coöperation of the sending operator, who will intentionally make exceedingly short transmitting-key-closures, by quickly tapping the transmitting key. Or if the sending station employs a low frequency source of current, such that the ordinary Morse dot as usually made by the operator in transmitting a message, will be a single spark, this will be suitable for measuring.

Lacking a sending spark inherently suitable for measurement, and also lacking the coöperation of the sending operator, the following means in the measuring set or meter may be employed to isolate for measurement a single spark out of a succession of such sparks as for example those comprising a Morse dash. The key $K^2$ is an ordinary Morse telegraph key, provided with a circuit-closing switch N which is here normally closed except when the key itself is to be used for the present purpose. This key $K^2$ is connected in the circuit of the detector D, which circuit is broken at 19, 20 to include the key $K^2$. By first opening switch N (the switch $S^2$ being closed in the position shown, to the contacts 5 and 18; and the switch $S^1$ being closed to the contact 9, both to permit the reception of signals from the sending station), and then sharply tapping the key $K^2$, the telephone $F^1$ will aurally indicate a single click corresponding to a single sending spark. The intensity of this sound may be balanced by the discharge of condenser $C^2$ caused by closing key $K^1$, as hereinbefore described. The sharp tapping of key $K^2$ will usually result in the capture of a single spark from a distant sending station in operation, because such tap will close the detector circuit for only an extremely short period of time, usually between five one-thousandths and one one-hundredth of a second.

This invention may, among other uses, be employed to measure the absolute sensitiveness of any oscillation detector of any type. To do this, the detector to be measured is connected in the detector circuit at D, and the switch $S^1$ is closed permanently to the contact 8 as shown, to make the condenser-discharge circuit operative entirely independently of any use of the antenna. The key $K^1$ is now tapped successively to cause a series of discharges of condenser $C^2$ to produce successive clicks in the telephone $F^1$. Meanwhile the testing operator will adjust down the potential of the condenser charge by varying the potentiometer P, until the sound in the telephone $F^1$ is just audible. The energy of this discharge will be the minimum amount of energy required to operate the detector to give a response in the telephone which is audible to the particular testing operator. Knowing the capacity of the condenser $C^2$, (which may be any arbitrary amount for this purpose), as indicated by its scale E, and knowing the potential of the condenser-charge as indicated by the potentiometer scale, the minimum energy required to operate the particular detector under observation may be calculated by means of the above specified formula. Likewise the amount of energy required to operate the detector to produce in the telephone a sound of any given intensity, may be measured and calculated in the same way, the potential of the condenser charge being varied until the sound of the desired intensity is produced.

This invention provides a valuable permanent adjunct in commercial wireless telegraphy installations, as it provides an easily operated means of accurately measuring all important variable electrical conditions thereat, with the exception of wave lengths which may be measured by any suitable wave-meter. Such means are obviously required at all installations, if the best service is to be maintained, and in accordance with the practice of ordinary wire telegraphy and telephony in the past.

I claim:

1. Means for measuring the energy from a source of electromagnetic waves, which comprises a condenser; a resistance device; means for connecting to different parts of said resistance device, said condenser and a conductor receiving the energy of electromagnetic waves; an induction-coil device, the secondary of which is connected to said resistance device intermediate the connections to the resistance device of the condenser and receiving conductor; a source of electromotive force for said induction-coil device and condenser, and for the receiving conductor; an indicating device, the circuit of which includes said resistance device; means for varying the capacity of the condenser; a condenser-discharging switch in circuit with said condenser; means for coöperatively associating said condenser and switch with a receiving apparatus operated by said receiving conductor; and means for varying the potential of the charge of the condenser.

2. Means for measuring the energy from a source of electromagnetic waves, which comprises a condenser; means for adjusting said condenser to the capacity of a conductor receiving the energy of the electromagnetic waves; means for operating the receiving apparatus normally associated with the receiving conductor, alternately by the source of waves acting on the receiving conductor, and by the abrupt discharge of said condenser; and means for varying the potential of the charge of the condenser.

3. Means for measuring the energy from a source of electromagnetic waves, which comprises a condenser; a charging circuit therefor; a discharging circuit for the condenser; a switch controlling both said circuits and constructed to automatically and normally close the charging circuit; and means for including in the discharging circuit, a receiving apparatus operable by the energy of the electromagnetic waves.

4. Means for measuring the energy from a source of electromagnetic waves, which comprises a condenser; a condenser-discharging switch in circuit with said condenser; means for coöperatively associating said condenser and switch with a receiving apparatus operable by the source of waves; a variable potentiometer for varying the potential of the condenser charge; and means for indicating the potential of the condenser charge.

5. Means for measuring the energy from a source of electromagnetic waves, which comprises a condenser constituting a source of high frequency oscillations; means for discharging the condenser through a receiving apparatus operable by said waves proportionately to the energy thereof; means for varying the potential of the charge of the condenser; and means for indicating the degree of said potential.

6. Means for measuring the energy from a source of electromagnetic waves, which comprises a local source of high frequency oscillating electrical energy; means for operating by said local source, a receiving apparatus operable by said waves proportionately to the energy thereof; means for varying the energy-output of said local source; and means for indicating the components of the energy of said output.

7. Means for measuring the energy from a source of electromagnetic waves, which comprises a condenser constituting a source of high frequency oscillations; means for operating a receiving apparatus operable by the source of waves alternately by such source of waves, and by the discharge of said condenser; means for varying the potential of the charge of said condenser; and means for indicating the degree of such potential.

8. Means for measuring the energy from a source of electromagnetic waves, which comprises a condenser; a normally short-circuited switch adapted to be included in circuit with a receiving apparatus operable by the source of waves; means for operating said receiving apparatus alternately by the energy of such source by said switch, and by the discharge of said condenser, means for varying the potential of the charge of said condenser; and means for indicating the degree of such potential.

9. Means for measuring the energy from a source of electromagnetic waves, which comprises a condenser; a quick-acting condenser-discharging switch in circuit with said condenser; means for including in circuit with said condenser and switch a receiving apparatus operable by the source of waves; means for varying the potential of the charge of said condenser; and means for indicating the degree of such potential.

10. Means for measuring the energy from a source of electromagnetic waves, which comprises a local source of high frequency oscillating electrical energy; means for operating a receiving apparatus operable by the source of waves, alternately by said local source and by the energy of the source of waves; means for varying the energy-output of said local source; and means for indicating the degree of said output.

11. Means for measuring the energy from a source of electromagnetic waves, which comprises a variable condenser constituting a source of high frequency oscillations; a source of electromotive force therefor; means for varying the potential of the condenser charge; means for discharging the condenser through a receiving apparatus operable by said waves proportionately to the energy thereof; and means for indicating the capacity of the condenser and the potential of its charge.

12. Means for measuring the energy from a source of electromagnetic waves, which comprises a condenser constituting a source of high frequency oscillations; means for varying the energy of the discharge of the condenser; means for discharging the condenser through a receiving apparatus operable by said waves proportionately to the energy thereof; and means for indicating the variables of the energy of the discharge.

13. Means for measuring the energy from a source of electromagnetic waves, which comprises a condenser constituting a source of high frequency oscillations; a source of electromotive force therefor; means for discharging the condenser through a receiving apparatus operable by said waves proportionately to the energy thereof; and means for varying the potential supplied to charge the condenser from said source of electromotive force.

14. Means for measuring the energy from a source of electromagnetic waves, which comprises a variable condenser; means for adjusting the capacity of the condenser to that of the receiving conductor of a receiving installation; a quick-acting switch adapted to be included in circuit with a receiving apparatus operable by the source of waves and receiving conductor; means for operating the receiving apparatus alternately by the energy of a distant source of waves by said switch, and by the abrupt discharge of said condenser; and means for varying the potential of the charge of the condenser.

15. Means for measuring the energy from a source of electromagnetic waves, which comprises a condenser; a quick-acting switch adapted to be included in circuit with receiving apparatus operable by the source of waves; means for operating the receiving apparatus alternately by the energy of the source of waves by said switch, and by the abrupt discharge of said condenser; and means for varying the potential of the charge of the condenser.

16. Means for measuring the energy from a source of electromagnetic waves, which comprises a condenser constituting a source of high frequency oscillations; means for varying the capacity of the condenser; means for operating receiving apparatus operable by said source, alternately by the energy of said source and by the abrupt discharge of said condenser; and means for varying the potential of the charge of the condenser within known degrees.

17. Means for measuring the energy from a source of electromagnetic waves, which comprises a condenser constituting a source of high frequency oscillations; means for operating receiving apparatus operable by said source, alternately by the energy of said source and by the abrupt discharge of said condenser; and means for varying the potential of the charge of the condenser.

GREENLEAF WHITTIER PICKARD.

Witnesses:
 MILLARD WOODSOME,
 HOWARD P. WITHINGTON.